H. C. Whitney.
Revolving Rake.

Nº 50060          Patented Sep. 19, 1865.

Witnesses.           Inventor
Henry C. Whitney.

UNITED STATES PATENT OFFICE.

HENRY C. WHITNEY, OF COXSACKIE, NEW YORK.

IMPROVEMENT IN HORSE-RAKES.

Specification forming part of Letters Patent No. 50,060, dated September 19, 1865.

*To all whom it may concern:*

Be it known that I, HENRY C. WHITNEY, of Coxsackie, in the county of Greene and State of New York, have invented, made, and applied to use a certain new and useful Improvement in Horse Hay-Rakes; and I do hereby declare the following to be a full, clear, and exact description of the said invention, reference being had to the annexed drawings, making part of this specification, wherein—

Figure 1:
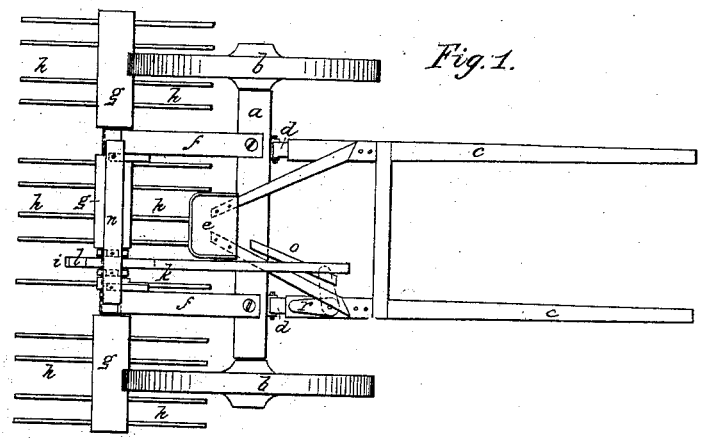
Figure 2:
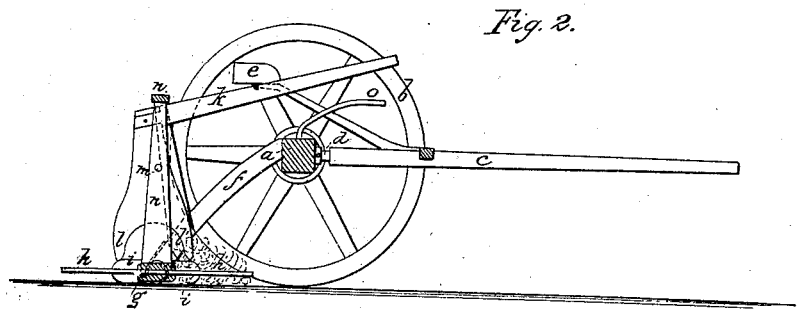
Figure 3:
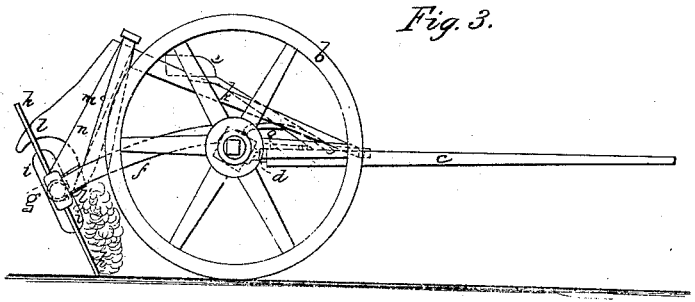

Figure 1 is a plan of said horse hay-rake. Fig. 2 is a section longitudinally of the rake as in use. Fig. 3 is a side view as ready for dumping the hay.

Similar marks of reference denote the same parts.

I make use of a revolving head to my horse hay-rake, with teeth or tines extending out from each side of the head, as has heretofore been employed; but I fit the same to revolve at the ends of arms extending from the axle of the sustaining-wheels, and on which axle the entire rake can be elevated by the driver in going to the field, and I provide a double-acting lever, that operates upon the rake-head to revolve the same through the agency of a cam or cams upon the rake-head.

In the drawings, $a$ is the axle; $b\ b$, the wheels; $c\ c$, the shafts, hinged at $d$ to the axle and carrying the seat $e$. $f\ f$ are arms extending from the axle, and formed with loops or bearings at their outer and lower ends for the head $g$ of the rake to revolve in; and $h\ h$ are the tines or teeth of the rake, extending on both sides of the head, and the head $g$ itself is much longer than the width between the wheels, but in consequence of the arms $f$ being attached directly to the axle $a$ the rake-head can be drawn with the points of the teeth near the point of contact of the wheels with the ground, so as to accommodate inequalities in the surface, and at the same time the rake can be revolved or turned over to free itself from the accumulated hay without being obstructed by the wheels.

Upon the rake-head is a cross-piece or elliptical cam, $i$, and over the same is a bent lever, $k$, with forked ends $l\ l'$ adjacent to the cam $i$. The handle part of the lever $k$ extends to the driver, and the lever is on a fulcrum at $m$. This fulcrum may be sustained as most convenient. I have, however, shown a frame, $n$, composed of side pieces extending from the arms $f$, with a cross-piece that carries the ends of the fulcrum-pieces at the sides of the lever $k$.

It will now be understood that when the lever $k$ is depressed the end $l'$ of the lever's fork, acting against the elliptical cam $i$, throws the forward end of the rake-teeth down and revolves the head sufficiently to bring the parts into the position of Fig. 3 and throw the rake over and clear it from the hay.

The teeth of the rake may be depressed by the same movements to cause them to travel nearer the surface of the ground, and when it is necessary to raise the advancing end of the teeth to pass an obstruction or accommodate the surface it may be done by raising the lever $k$, when the fork $l$ will act on the near side of the elliptical cam $i$ and raise the front ends of the rake-teeth.

If required, the movement last described might be employed to throw the rake over while the apparatus was being backed.

In order to elevate the rake when going to or leaving the field, I employ a lever, $o$, projecting to the front of the axle and reaching forward to where the driver can put his foot on it to press it down and raise the arms and rake, and a button or catch is provided at $r$, by which the lever is retained when depressed.

What I claim, and desire to secure by Letters Patent, is—

The combination of the revolving rake-head $g$, lever $k$, forks $l\ l'$, and projections or cams $i$, with the arms $f$ and elevating-lever $o$, substantially as specified.

In witness whereof I have hereunto set my signature this 24th day of March, 1865.

HENRY C. WHITNEY.

Witnesses:
  A. J. DONNAN,
  CHAS. E. LAMPMAN.